United States Patent Office 3,515,169
Patented June 2, 1970

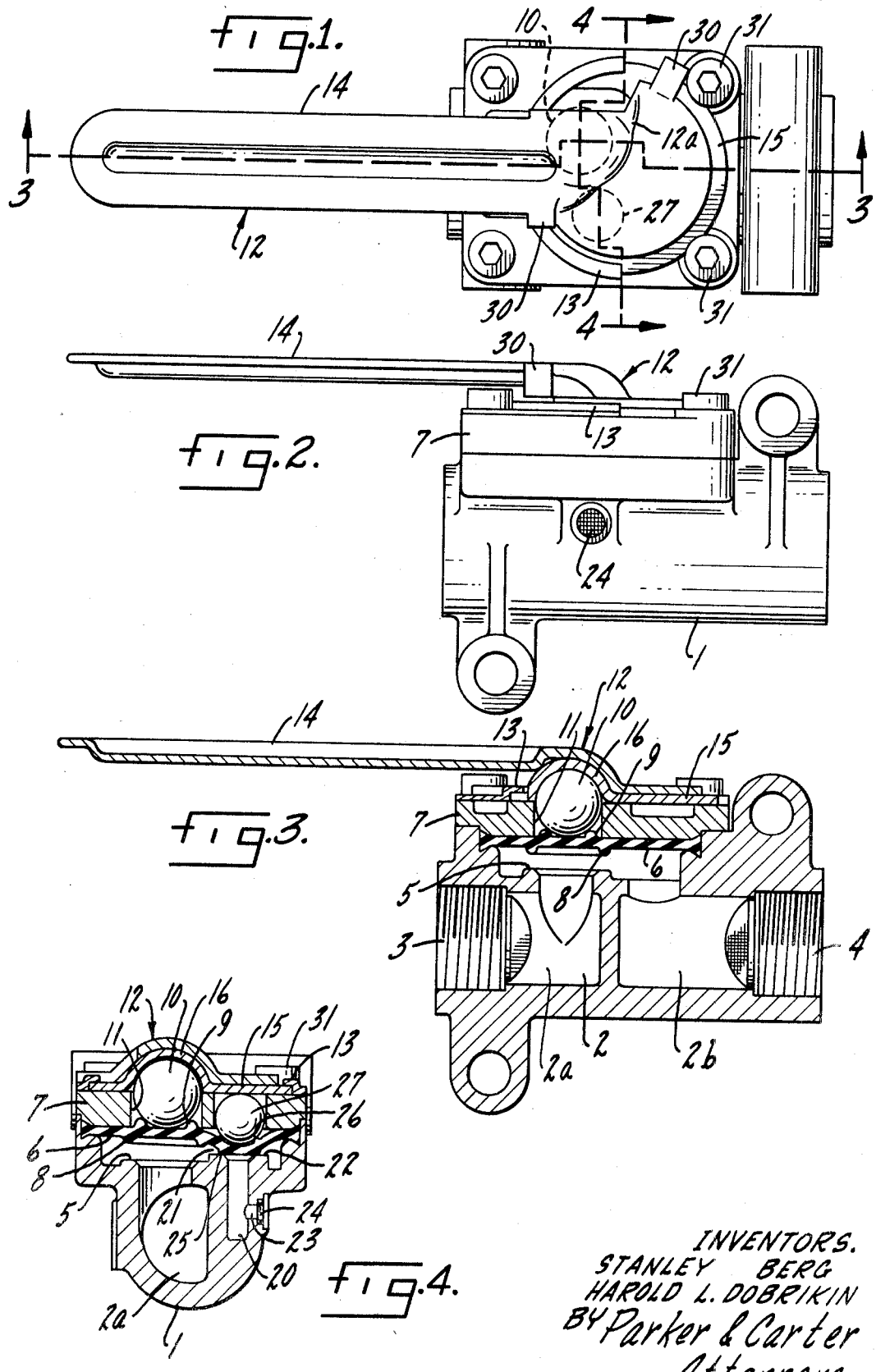

3,515,169
SHUTOFF COCK
Stanley Berg, Skokie, and Harold L. Dobrikin, Highland Park, Ill., assignors to Berg Mfg. & Sales Co., Des Plaines, Ill., a corporation of Illinois
Filed May 13, 1968, Ser. No. 728,456
Int. Cl. F16k 31/60, 7/16, 15/14
U.S. Cl. 137—625.25                                8 Claims

ABSTRACT OF THE DISCLOSURE

A shutoff cock incorporating a diaphragm, a roller member and a camming element positioned to cam the roller to seat the diaphragm. A second roller urges another portion of the diaphragm into a position closing an exhaust passage.

SUMMARY OF THE INVENTION

A housing has a passage therethrough with an intermediate seat. A diaphragm overlies the seat and a ball is carried thereon. A camming member is movable to urge the ball against the diaphragm and the diaphragm into passage-closing position on said seat. An exhaust outlet passage has a seat portion aligned with another part of the diaphragm and a second ball is urged by said camming element into engagement with the diaphragm to seat the same on said exhaust seat. The camming member and ball elements are arranged to urge their respective portions into seating engagement alternatively.

The invention has particular relation to shutoff cocks usable in fluid pressure systems such as the air brake system of a vehicle, for example.

One purpose of the invention is to provide a shutoff cock of maximum simplicity and economy in manufacture, construction and use.

Another purpose is to provide a shutoff cock having a positive action though formed of minimum parts.

Another purpose is to provide a shutoff cock construction having exhaust means.

Another purpose is to provide a shutoff cock having a single operating element effective selectively to open and close a fluid pressure passage and to exhaust a segment thereof.

Another purpose is to provide a shutoff cock having a single operating member effective alternatively to close an exhaust passage and open a main passage and to close a main passage and open an exhaust passgae.

Another purpose is to provide a shutoff cock employing a single diaphragm having portions positioned for closing a plurality of passage segments.

Another purpose is to provide a shutoff cock employing a diaphragm having means thereon for positioning a diaphragm-operating element.

Another purpose is to provide a shutoff cock having a diaphragm valve member operable with minimum distortion thereof.

Other purposes will appear from time to time during the course of the specification and claims.

BRIEF DESCRIPTION OF THE DRAWINGS

The invention is illustrated more or less diagrammatically in the accompanying drawings wherein:
FIG. 1 is a top plan view;
FIG. 2 is a side view;
FIG. 3 is a view taken on the line 3—3 of FIG. 1 with parts in cross section; and
FIG. 4 is a view taken on the line 4—4 of FIG. 1 with parts in cross section.

Like parts are indicated by like numerals throughout the specification and drawings.

DESCRIPTION OF THE PREFERRED EMBODIMENT

Referring now to the drawings, the numeral 1 generally designates a housing. The housing 1 has a passage 2 formed therein and with an upstream portion 2a and a downstream portion 2b. Indicated at 3 is an inlet for passage 2 and an outlet therefor is indicated at 4. Intermediate the inlet 3 and outlet 4 of passage 2 a seat 5 is formed in housing 1. Clamped onto housing 1 and overlying the seat 5 is a diaphragm 6 formed of suitably flexible material. A housing part or cover 7 may be employed to clamp the diaphragm 6 in housing 1.

The portion of diaphragm 6 immediately overlying seat 5 carries a circular or annular ridge 8 positioned for seating upon the seat 5 to close passage 2 against communication of inlet 3 with outlet 4.

On the opposite face of diaphragm 6 from ridge 8 a circular ridge 9 rises from diaphragm 6 to receive and position a rollable element, such as ball 10, on diaphragm 6. Wall segments 11 generally retain ball 10.

An operating, camming member 12 overlies the ball 10 and is rotatable beneath a semicircular retaining overhang 13 on housing 1. Rotation of camming element 12 may be accomplished manually through the mediacy of handle portion 14 extending from the camming or ramp member 12.

Member 12 includes a combination of handle 14, the inner end portion of which overlies and is secured to an under element 15 rotatable on the upper surface of cover 7. The rise 16 in element 15 permits ball 10 to rise into the open position shown in FIG. 3, for example.

A branch exhaust passage 20 communicates with the downstream passage segment 2b as indicated generally at 21. Intermediate its ends the exhaust passage 20 has a seat 22 formed in the housing 1. The exhaust passage 20 communicates with atmosphere through the exhaust outlet 23 in which a filter 24 may be conveniently positioned.

It will be observed that a second portion of diaphragm 6 overlies the seat 22 and that the diaphragm 6 has a circular ridge configuration 25 positioned for contact with seat 22. A circular ridge 26 rises from the opposite face of diaphragm 6 to receive and position a second rollable element, such as the ball 27. The camming member 12 overlies ball 27.

Limit stops or abutment elements 30 are formed on member 12 for contact with suitable limiting abutments 31 formed on housing 1. The abutments may conveniently take the form of the heads of fasteners securing cover 7.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention. For example, while the invention is particularly useful in fluid pressure vehicle brake systems, it will be realized that the invention may be equally useful in any system requiring a shutoff cock without departing from the nature and scope of the invention.

The use and operation of the invention are as follows:

With the camming member 12 in the position shown, for example, in FIG. 3, fluid pressure entering inlet 3 is effective, in cooperation with the natural resiliency of diaphragm 6, to retain the diaphragm 6 in its open position, as shown. With the diaphragm 6 in said position the valve seat 5 is open and fluid pressure is free to flow through the passage 2 to outlet 4.

When the operator desires to close the shuttle cock of the invention, the member 12 is rotated to draw the ramp or camming portion 12a thereof across the ball 10 and thus to urge the ball 10 and diaphragm 6 downwardly to seat the ridge 8 on seat 5 and close passage 2 against communication of inlet 3 with outlet 4. With the provision of ridge 8 in axial alignment with seat 5, the diaphragm 6 need be distorted only the smallest amount to close the passage 2 against communication of inlet 3 with outlet 4. When member 12 is thus rotated, the rise 16 moves from its position overlying ball 10 and the lower, substantially horizontal portion of element 15 moves over ball 10.

With exhaust passage 20 present, a seat 22, diaphragm ridges 25, 26 and ball 27 are provided on opposite sides of another portion of diaphragm 6 to provide exhaust of passage 2. As shown, exhaust passage 20 is positioned on the downstream side of seat 5 for exhaust of passage segment 2b and exhaust of the fluid pressure system (not shown) communicating with outlet 4 when seat 5 has been closed by diaphragm ridge 8.

It will be understood that the rise 16 of camming or ramp element 15 of member 12 is arranged to overlie ball 27 when it has been moved out of its position overlying ball 10. The rise 16 thus permits ball 27, in response to fluid pressure in passage segment 2b and the resiliency of diaphragm 6, to rise into its open position. Thus movement of member 12 to seat ridge 8 on seat 5 permits the fluid pressure in the downstream portion 2b of passage 2 to exhaust to atmosphere through seat 22, passage 20 and outlet 23. Conversely, movement of member 12 into a position permitting the separation of ridge 8 from seat 5, as the parts are shown for example in FIG. 3, produces a movement of substantially flat areas of element 15 over ball 27 to urge the ball 27 downwardly and to seat ridge 25 on exhaust passage seat 22 and thus to close downstream passage portion 2b against communication with atmosphere, as shown for example in FIG. 4. While exhaust of downstream passage segment 2b is shown, it will be realized that the exhaust structure may be positioned as desired beneath diaphragm 6 without departing from the nature and scope of the invention.

The embodiments of the invention in which an exclusive property or privilege is claimed are defined as follows:

1. A shutoff cock including a housing, a passage through said housing and having an inlet and an outlet, a seat formed intermediate said inlet and outlet, a diaphragm secured in said housing and having a portion of one surface overlying said seat, a rollable element engaging a portion of the opposite surface of said diaphragm in substantially axial alignment with said seat, an operating member movable on said housing and having a camming portion engaging said rollable element whereby movement of said camming portion across said element urges said element and said overlying diaphragm surface portion toward said seat.

2. The structure of claim 1 characterized by and including a ridge configuration formed on said overlying surface of said diaphragm and positioned to engage said seat when said rollable element is urged toward said seat.

3. The structure of claim 1 characterized by and including a circular ridge formed on said opposite surface of said diaphragm and positioned to receive and position said rollable element on said diaphragm.

4. The structure of claim 1 characterized by and including an exhaust passage communicating with said first-named passage, a second seat formed intermediate the ends of said exhaust passage and underlying another portion of said first-named diaphragm surface, a second rollable element engaging said opposite diaphragm surface in axial alignment with said second seat, said operating member having a camming portion engaging said second rollable element and positioned to urge the same toward said seat.

5. The structure of claim 4 characterized by and including a circular ridge formed on said last-named diaphragm surface portion and positioned to engage said second seat.

6. The structure of claim 4 characterized by and including a circular ridge formed on said other portion of said first-named diaphragm surface and positioned to receive and position said second rollable element.

7. The structure of claim 4 wherein said operating member includes portions at varying levels and movable across said first and second rollable elements to move said first and second rollable elements in opposite directions whereby said second seat is closed when said first seat is open and said first seat is closed when said second seat is open.

8. A shutoff cock including a housing, a first passage through said housing, an exhaust passage in said housing, a first seat controlling said first passage, a second seat controlling said exhaust passage, a diaphragm overlying said first and second seats, a pair of rollable elements overlying said diaphragm, and an operating member movable on said housing and overlying said rollable elements, said operating member having camming portions engageable with said rollable elements whereby one of said elements is urged toward one of said seats in response to movement of said operating member in one direction and the other of said elements is urged toward the other of said seats in response to movement of said operating member in another direction.

References Cited

UNITED STATES PATENTS

| 745,027 | 11/1903 | Stone | 251—255 |
| 2,928,421 | 3/1960 | Nordstrand | 137—625.25 XR |
| 3,279,748 | 10/1966 | Fleckenstein et al. | 251—331 |

HENRY T. KLINKSIEK, Primary Examiner

U.S. Cl. X.R.

251—251, 331